(12) United States Patent
Mishra et al.

(10) Patent No.: US 12,549,216 B2
(45) Date of Patent: Feb. 10, 2026

(54) TRANSMIT (TX) LOCAL OSCILLATOR (LO) LEAKAGE CALIBRATION

(71) Applicant: QUALCOMM INCORPORATED, San Diego, CA (US)

(72) Inventors: Chinmaya Mishra, San Diego, CA (US); Abdellatif Bellaouar, Richardson, TX (US); Damin Cao, San Diego, CA (US); Rajagopalan Rangarajan, San Diego, CA (US); Kevin Hsi-Huai Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 584 days.

(21) Appl. No.: 17/950,299

(22) Filed: Sep. 22, 2022

(65) Prior Publication Data

US 2024/0106490 A1 Mar. 28, 2024

(51) Int. Cl.
*H04B 1/44* (2006.01)
*H03F 3/24* (2006.01)
*H04B 1/00* (2006.01)

(52) U.S. Cl.
CPC .............. *H04B 1/44* (2013.01); *H03F 3/245* (2013.01); *H04B 1/0067* (2013.01); *H03F 2200/165* (2013.01); *H03F 2200/171* (2013.01); *H03F 2200/294* (2013.01); *H03F 2200/451* (2013.01)

(58) Field of Classification Search
CPC ......... H03F 2200/165; H03F 2200/171; H03F 2200/294; H03F 2200/451; H03F 3/245; H04B 1/0067; H04B 1/30; H04B 1/44; H04B 1/525
See application file for complete search history.

(56) References Cited

U.S. PATENT DOCUMENTS

| | | | |
|---|---|---|---|
| 9,397,720 B2* | 7/2016 | Jerng | ........................ H04B 1/44 |
| 10,917,132 B1* | 2/2021 | Wyse | .................... H04B 1/0475 |
| 2002/0123319 A1 | 9/2002 | Peterzell | |
| 2006/0030277 A1* | 2/2006 | Cyr | ....................... H04B 1/0003 |
| | | | 455/84 |

(Continued)

FOREIGN PATENT DOCUMENTS

| | | |
|---|---|---|
| CN | 217332718 U | 8/2022 |
| WO | 2011124533 A1 | 10/2011 |

OTHER PUBLICATIONS

International Search Report and Written Opinion—PCT/US2023/031219—ISA/EPO—Dec. 14, 2023.

*Primary Examiner* — Kashif Siddiqui
(74) *Attorney, Agent, or Firm* — Smith Tempel Blaha LLC/Qualcomm Incorporated

(57) ABSTRACT

A transmit (TX) local oscillator (LO) leakage calibration circuit including a transceiver having a transmit portion and a receive portion, an interface circuit connected to the transmit portion and the receive portion, an impedance control circuit connected to a low noise amplifier (LNA) in the receive portion, the impedance control circuit configured to adjust an input impedance for the LNA, a power detector coupled to an output of the LNA, and a local oscillator cancellation element connected to the power detector, the local oscillator cancellation element configured to adjust an input to the transmit portion based on TX LO leakage detected by the power detector.

13 Claims, 9 Drawing Sheets

(56) References Cited

U.S. PATENT DOCUMENTS

| | | | |
|---|---|---|---|
| 2008/0181337 A1* | 7/2008 | Maxim | H03M 1/0614 |
| | | | 455/230 |
| 2012/0257656 A1* | 10/2012 | Kang | H04B 1/525 |
| | | | 375/221 |
| 2013/0052964 A1* | 2/2013 | Husted | H04B 17/11 |
| | | | 455/73 |
| 2014/0030988 A1* | 1/2014 | Fu | H04B 17/318 |
| | | | 455/73 |
| 2014/0050124 A1* | 2/2014 | Yang | H04B 1/71072 |
| | | | 370/278 |
| 2016/0094331 A1* | 3/2016 | White | H04L 5/14 |
| | | | 370/278 |
| 2022/0077827 A1 | 3/2022 | Jiang et al. | |
| 2023/0187824 A1* | 6/2023 | Zeeshan | H01Q 25/002 |
| | | | 343/702 |

* cited by examiner

TRANSMIT (TX) LOCAL OSCILLATOR (LO) LEAKAGE CALIBRATION

FIELD

The present disclosure relates generally to electronics, and more specifically to a local oscillator used in a transceiver.

BACKGROUND

Wireless communication devices and technologies are becoming ever more prevalent, as are communication devices that operate at millimeter-wave (mmW) frequencies. Wireless communication devices generally transmit and/or receive communication signals. In a radio frequency (RF) transceiver, a communication signal is typically amplified and transmitted by a transmit section and a received communication signal is amplified and processed by a receive section. A transceiver for communication in 5G and 6G applications generally communicates using millimeter wave (mmW) frequency signals and uses what is referred to as a super heterodyne architecture. A super heterodyne architecture is one where a baseband information signal is upconverted to an intermediate frequency (IF) before being further upconverted to radio frequency (RF) signal for transmission. However, as the number of frequencies continues to expand, the use of a super heterodyne architecture in a mmW frequency communication system may become problematic due to conflict between the mmW communication frequencies and the frequency of a local oscillator (LO) signal used to translate the mmW frequencies.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a transmit (TX) local oscillator (LO) leakage calibration circuit including a transceiver having a transmit portion and a receive portion, an interface circuit connected to the transmit portion and the receive portion, an impedance control circuit connected to a low noise amplifier (LNA) in the receive portion, the impedance control circuit configured to adjust an input impedance for the LNA, a power detector coupled to an output of the LNA, and a local oscillator cancellation element connected to the power detector, the local oscillator cancellation element configured to adjust an input to the transmit portion based on TX LO leakage detected by the power detector.

Another aspect of the disclosure provides a method for transmit (TX) local oscillator (LO) leakage calibration including directing a transmit signal having TX LO leakage to a receiver, the receiver co-located with a transmitter from which the transmit signal is directed, adjusting an impedance at an input to a low noise amplifier (LNA) in the receiver, detecting an LO signal at an output of the receiver, determining LO leakage from the LO signal, and correcting for the LO leakage.

Another aspect of the disclosure provides a device including means for directing a transmit signal having TX LO leakage to a receiver, the receiver co-located with a transmitter from which the transmit signal is directed, means for adjusting an impedance at an input to a low noise amplifier (LNA) in the receiver, means for detecting an LO signal at an output of the receiver, means for determining LO leakage from the LO signal, and means for correcting for the LO leakage.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In a communication device transceiver, one or more mmW frequency signals may be upconverted and downconverted using a local oscillator (LO) signal.

In a communication device transceiver, signal upconversion and signal downconversion may occur using a direct conversion architecture, e.g., one using a low IF (LIF), or a zero IF (ZIF) architecture. In a communication device transceiver using a direct conversion architecture, e.g., one using a low IF (LIF), or a zero IF (ZIF) and operating at millimeter wave (mmW) frequencies, the local oscillator (LO) signal that is used for signal upconversion and signal downconversion appear at very high frequencies, on the order of tens of gigahertz (GHz). At such high frequencies, LO signal leakage from a transmit circuit may interfere with operation of a receiver. For example, it is desirable to be able to discern between the desired communication information signal and LO signal leakage, and also have a way to control or minimize the LO leakage power.

In an exemplary embodiment, a TX LO leakage calibration circuit detects LO leakage at mmW frequencies and performs calibration at baseband (LIF or ZIF).

In an exemplary embodiment, a TX LO leakage calibration circuit performs LO calibration on the transceiver chip.

In an exemplary embodiment, a TX LO leakage calibration circuit performs LO calibration without intermediate frequency signal mixing or intermediate frequency signal downconversion.

In an exemplary embodiment, a TX LO leakage calibration circuit performs LO calibration using a receiver section of a transceiver in a calibration mode to detect TX LO signal leakage from the transmit section of the transceiver.

Figure 1:
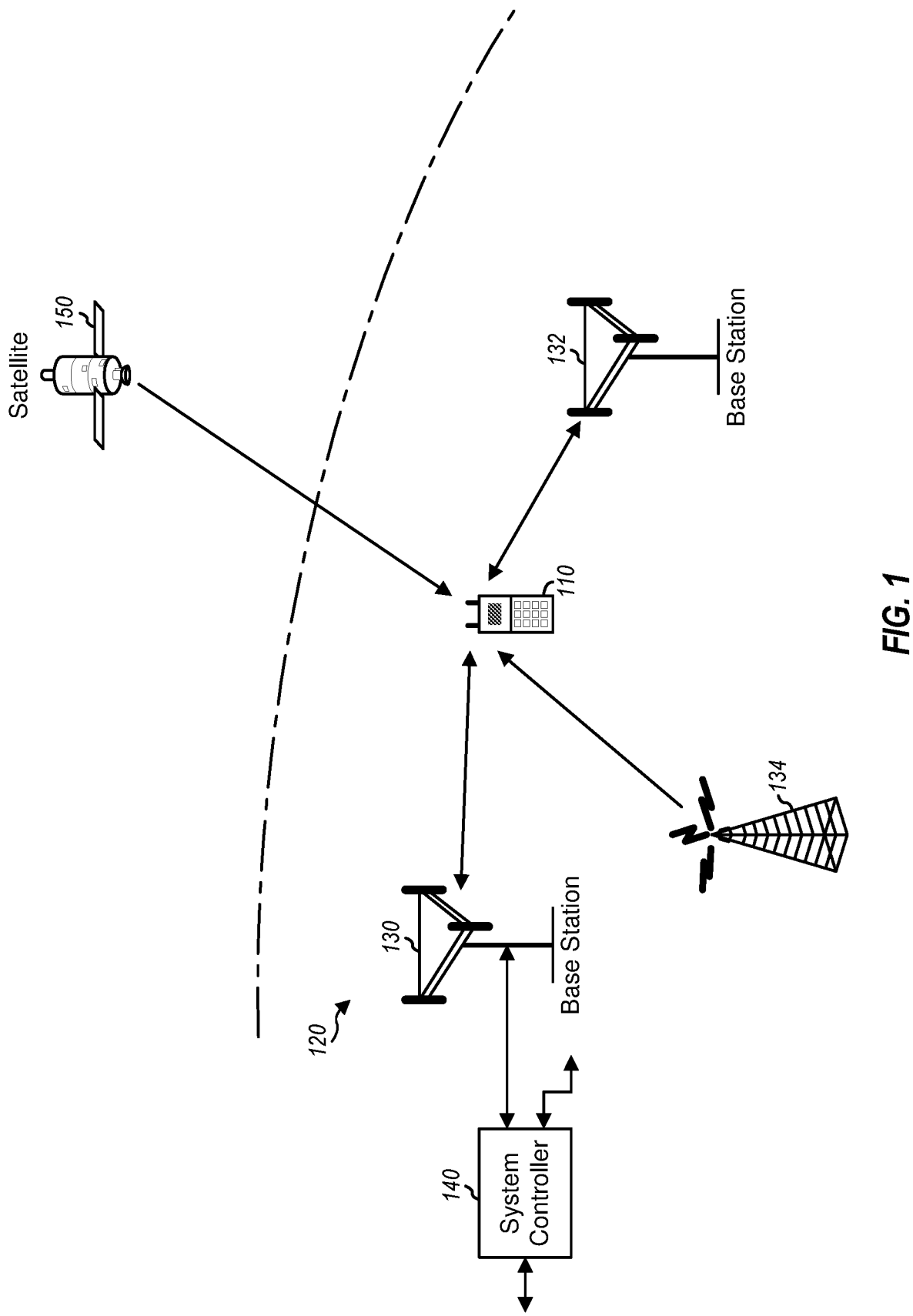
FIG. 1 is a diagram showing a wireless device communicating with a wireless communication system.

FIG. 1 is a diagram showing a wireless device 110 communicating with a wireless communication system 120. The wireless communication system 120 may be a Long Term Evolution (LTE) system, a Code Division Multiple Access (CDMA) system, a Global System for Mobile Communications (GSM) system, a wireless local area network (WLAN) system, a 5G NR (new radio) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA. For simplicity, FIG. 1 shows wireless communication system 120 including two base stations 130 and 132 and one system controller 140. In general, a wireless communication system may include any number of base stations and any set of network entities.

The wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a tablet, a cordless phone, a medical device, an automobile, a device configured to connect to one or more other devices (for example through the internet of things), a wireless local loop (WLL) station, a Bluetooth device, etc. Wireless device 110 may communicate with wireless communication system 120. Wireless device 110 may also receive signals from broadcast stations (e.g., a broadcast station 134) and/or signals from satellites (e.g., a satellite 150 in one or more global navigation satellite systems (GNSS)), etc). Wireless device 110 may support one or more radio technologies for wireless communication such as LTE, WCDMA, CDMA 1×, EVDO, TD-SCDMA, GSM, 802.11, 802.15, 5G, Sub6 5G, 6G, UWB, etc.

Wireless device 110 may support carrier aggregation, for example as described in one or more LTE or 5G standards. In some embodiments, a single stream of data is transmitted over multiple carriers using carrier aggregation, for example as opposed to separate carriers being used for respective data streams. Wireless device 110 may be able to operate in a variety of communication bands including, for example, those communication bands used by LTE, WiFi, 5G or other communication bands, over a wide range of frequencies. Wireless device 110 may also be capable of communicating directly with other wireless devices without communicating through a network.

In general, carrier aggregation (CA) may be categorized into two types—intra-band CA and inter-band CA. Intra-band CA refers to operation on multiple carriers within the same band. Inter-band CA refers to operation on multiple carriers in different bands.

Figure 2A:
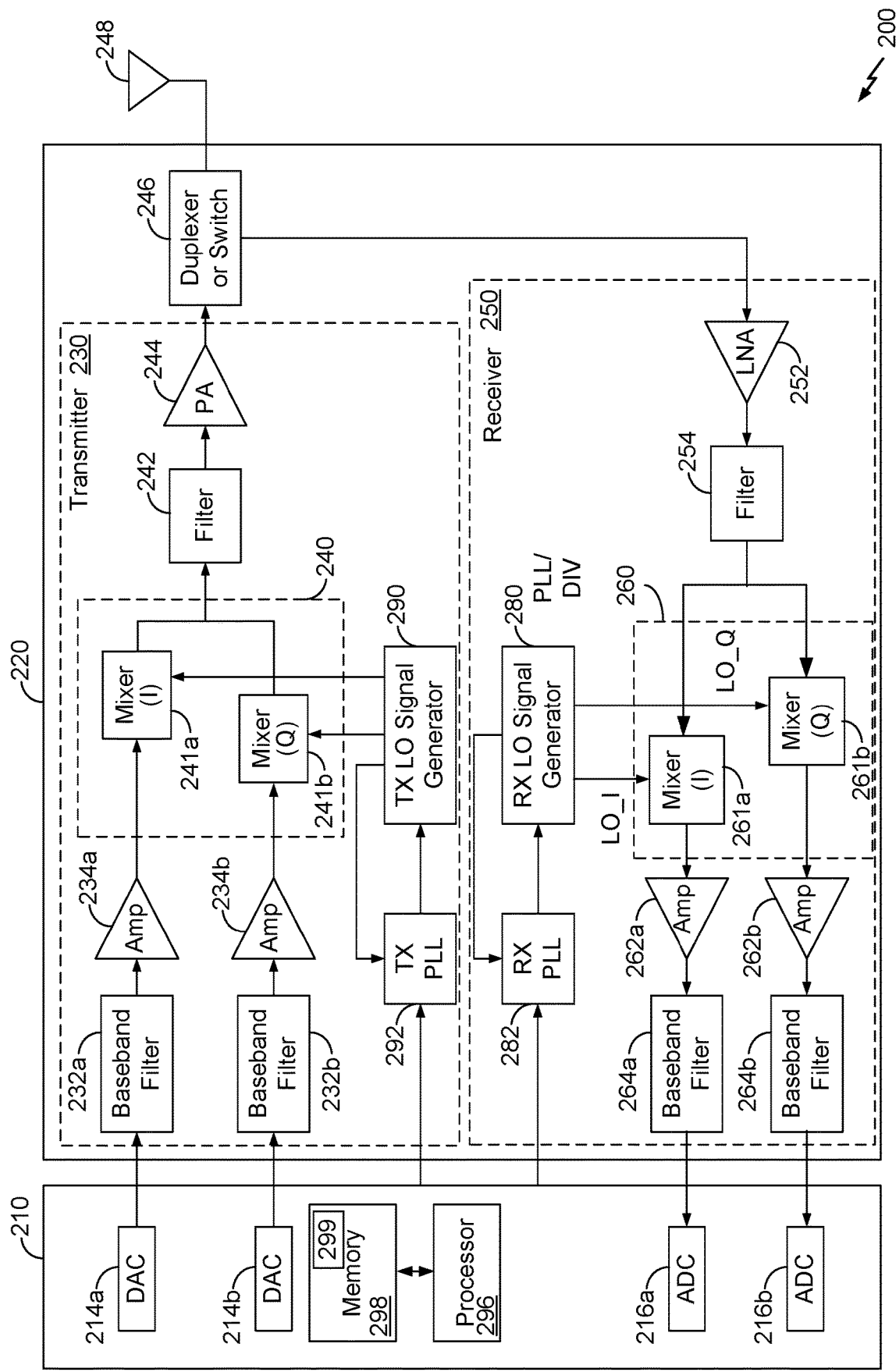
FIG. 2A is a block diagram showing a wireless device in which exemplary techniques of the present disclosure may be implemented.

FIG. 2A is a block diagram showing a wireless device 200 in which exemplary techniques of the present disclosure may be implemented. The wireless device 200 may, for example, be an embodiment of the wireless device 110 illustrated in FIG. 1.

FIG. 2A shows an example of a transceiver 220 having a transmitter 230 and a receiver 250. In general, the conditioning of the signals in the transmitter 230 and the receiver 250 may be performed by one or more stages of amplifier, filter, upconverter, downconverter, etc. These circuit blocks may be arranged differently from the configuration shown in FIG. 2A. Furthermore, other circuit blocks not shown in FIG. 2A may also be used to condition the signals in the transmitter 230 and receiver 250. Unless otherwise noted, any signal in FIG. 2A, or any other figure in the drawings, may be either single-ended or differential. Some circuit blocks in FIG. 2A may also be omitted.

In the example shown in FIG. 2A, wireless device 200 generally comprises the transceiver 220 and a data processor 210. The data processor 210 may include a processor 296 operatively coupled to a memory 298. The memory 298 may be configured to store data and program codes shown generally using reference numeral 299, and may generally comprise analog and/or digital processing components. The processor 296 and the memory 298 may cooperate to control, configure, program, or otherwise fully or partially control some or all of the operation of the embodiments of the TX LO leakage calibration circuit described herein.

The transceiver 220 includes a transmitter 230 and a receiver 250 that support bi-directional communication. In general, wireless device 200 may include any number of transmitters and/or receivers for any number of communication systems and frequency bands. All or a portion of the transceiver 220 may be implemented on one or more analog integrated circuits (ICs), RF ICs (RFICs), mixed-signal ICs, etc.

A transmitter or a receiver may be implemented with a super-heterodyne architecture or a direct-conversion architecture. In the super-heterodyne architecture, a signal is frequency-converted between radio frequency (RF) and baseband in multiple stages, e.g., from RF to an intermediate frequency (IF) in one stage, and then from IF to baseband in another stage for a receiver. In the direct-conversion architecture, a signal is frequency converted between RF and baseband in one stage. The super-heterodyne and direct-conversion architectures may use different circuit blocks and/or have different requirements. In the example shown in FIG. 2A, transmitter 230 and receiver 250 are implemented with the direct-conversion architecture.

In the transmit path, the data processor 210 processes data to be transmitted and provides in-phase (I) and quadrature (Q) analog output signals to the transmitter 230. In an exemplary embodiment, the data processor 210 includes digital-to-analog-converters (DAC's) 214a and 214b for converting digital signals generated by the data processor 210 into the I and Q analog output signals, e.g., I and Q output currents, for further processing. In other embodiments, the DACs 214a and 214b are included in the transceiver 220 and the data processor 210 provides data (e.g., for I and Q) to the transceiver 220 digitally.

Within the transmitter 230, baseband (e.g., lowpass) filters 232a and 232b filter the I and Q analog transmit signals, respectively, to remove undesired images caused by the prior digital-to-analog conversion. Amplifiers (Amp) 234a and 234b amplify the signals from baseband filters 232a and 232b, respectively, and provide I and Q baseband signals. An upconverter 240 having upconversion mixers 241a and 241b upconverts the I and Q baseband signals with I and Q transmit (TX) local oscillator (LO) signals from a TX LO signal generator 290 and provides an upconverted signal. A filter 242 filters the upconverted signal to remove undesired images caused by the frequency upconversion as well as noise in a receive frequency band. A power amplifier (PA) 244 amplifies the signal from filter 242 to obtain the desired output power level and provides a transmit RF signal. The transmit RF signal may be routed through a duplexer or switch 246 and transmitted via an antenna 248. While examples discussed herein utilize I and Q signals, those of skill in the art will understand that components of the transceiver may be configured to utilize polar modulation.

In the receive path, antenna 248 receives communication signals and provides a received RF signal, which may be routed through duplexer or switch 246 and provided to a low noise amplifier (LNA) 252. The duplexer 246 is designed to operate with a specific RX-to-TX duplexer frequency separation, such that RX signals are isolated from TX signals. The received RF signal is amplified by LNA 252 and filtered by a filter 254 to obtain a desired RF input signal.

Downconversion mixers 261a and 261b in a downconverter 260 mix the output of filter 254 with I and Q receive (RX) LO signals (i.e., LO_I and LO_Q) from an RX LO signal generator 280 to generate I and Q baseband signals. The I and Q baseband signals are amplified by amplifiers 262a and 262b and further filtered by baseband (e.g., lowpass) filters 264a and 264b to obtain I and Q analog input signals, which are provided to data processor 210. In the exemplary embodiment shown, the data processor 210 includes analog-to-digital-converters (ADC's) 216a and 216b for converting the analog input signals into digital signals to be further processed by the data processor 210. In some embodiments, the ADCs 216a and 216b are included in the transceiver 220 and provide data to the data processor 210 digitally.

In FIG. 2A, TX LO signal generator 290 generates the I and Q TX LO signals used for frequency upconversion, while RX LO signal generator 280 generates the I and Q RX LO signals used for frequency downconversion. Each LO signal is a periodic signal with a particular fundamental frequency. A phase locked loop (PLL) 292 receives timing information from data processor 210 and generates a control signal used to adjust the frequency and/or phase of the TX LO signals from LO signal generator 290. Similarly, a PLL 282 receives timing information from data processor 210 and generates a control signal used to adjust the frequency and/or phase of the RX LO signals from LO signal generator 280.

Wireless device 200 may support CA and may (i) receive multiple downlink signals transmitted by one or more cells on multiple downlink carriers at different frequencies and/or (ii) transmit multiple uplink signals to one or more cells on multiple uplink carriers. Those of skill in the art will understand, however, that aspects described herein may be implemented in systems, devices, and/or architectures that do not support carrier aggregation.

Certain components of the transceiver 220 are functionally illustrated in FIG. 2A, and the configuration illustrated therein may or may not be representative of a physical device configuration in certain implementations. For example, as described above, transceiver 220 may be implemented in various integrated circuits (ICs), RF ICs (RFICs), mixed-signal ICs, etc. In some embodiments, the transceiver 220 is implemented on a substrate or board such as a printed circuit board (PCB) having various modules, chips, and/or components. For example, the power amplifier 244, the filter 242, and the duplexer 246 may be implemented in separate modules or as discrete components, while the remaining components illustrated in the transceiver 220 may be implemented in a single transceiver chip.

The power amplifier 244 may comprise one or more stages comprising, for example, driver stages, power amplifier stages, or other components, that can be configured to amplify a communication signal on one or more frequencies, in one or more frequency bands, and at one or more power levels. Depending on various factors, the power amplifier 244 can be configured to operate using one or more driver stages, one or more power amplifier stages, one or more impedance matching networks, and can be configured to provide good linearity, efficiency, or a combination of good linearity and efficiency.

In an exemplary embodiment in a super-heterodyne architecture, the PA 244 and LNA 252 (and filter 242 and filter 254 in some examples) may be implemented separately from other components in the transmitter 230 and receiver 250, for example on a millimeter wave integrated circuit. An example super-heterodyne architecture is illustrated in FIG. 2B.

Figure 2B:
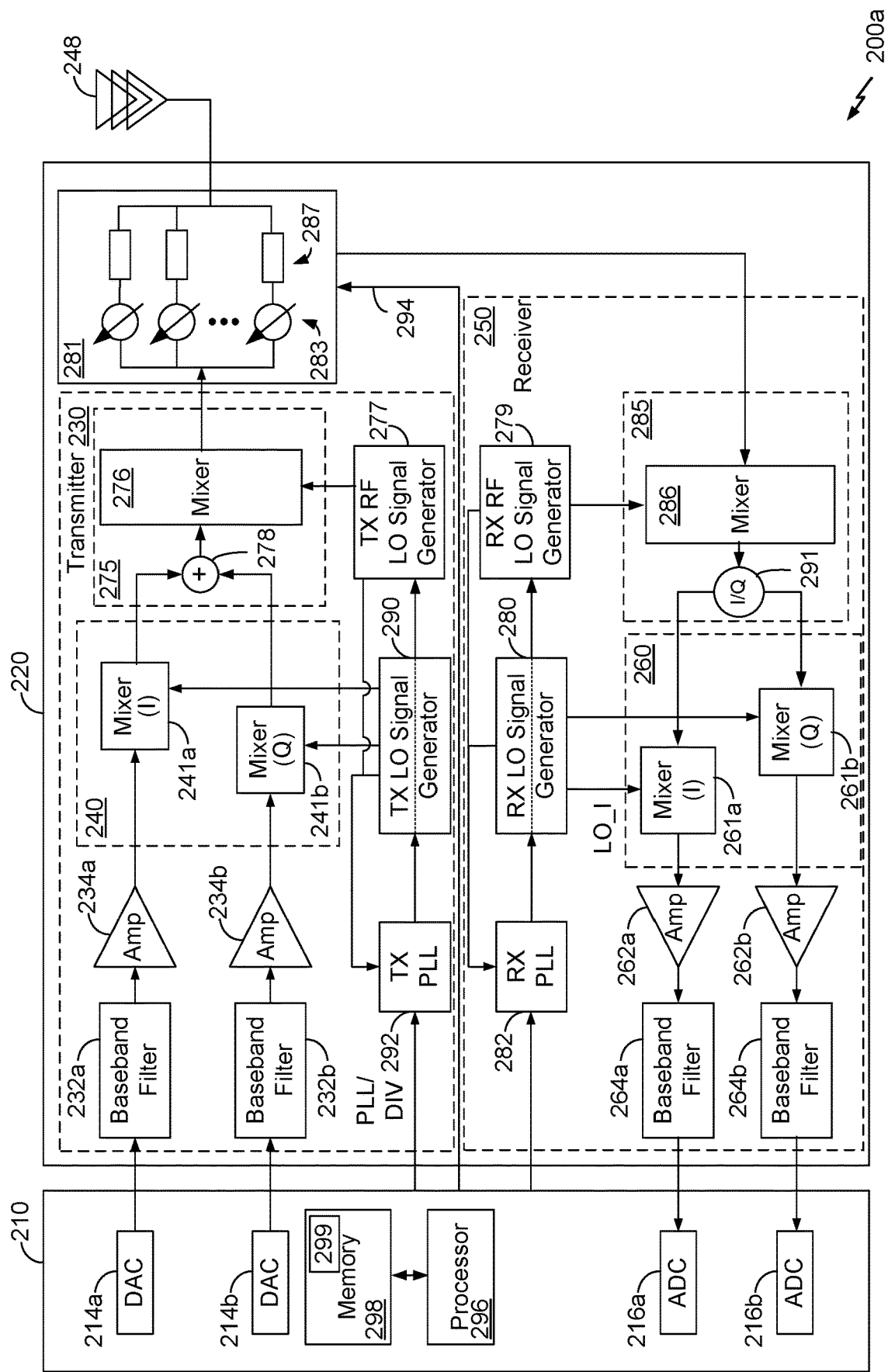
FIG. 2B is a block diagram showing a wireless device in which exemplary techniques of the present disclosure may be implemented.

FIG. 2B is a block diagram showing a wireless device in which exemplary techniques of the present disclosure may be implemented. Certain components, for example which may be indicated by identical reference numerals, of the wireless device 200a in FIG. 2B may be configured similarly to those in the wireless device 200 shown in FIG. 2A and the description of identically numbered items in FIG. 2B will not be repeated.

The wireless device 200a is an example of a heterodyne (or superheterodyne) architecture in which the upconverter 240 and the downconverter 260 are configured to process a communication signal between baseband and an intermediate frequency (IF). The IF signal may be a low IF (LIF) signal, or a zero (or near zero) IF (ZIF) signal. For example, the upconverter 240 may be configured to provide an IF signal to an upconverter 275. In an exemplary embodiment, the upconverter 275 may comprise summing function 278 and upconversion mixer 276. The summing function 278 combines the I and the Q outputs of the upconverter 240 and provides a non-quadrature signal to the mixer 276. The non-quadrature signal may be single ended or differential. The mixer 276 is configured to receive the IF signal from the upconverter 240 and TX RF LO signals from a TX RF LO signal generator 277, and provide an upconverted RF signal to phase shift circuitry 281. While PLL 292 is illustrated in FIG. 2B as being shared by the signal generators 290, 277, a respective PLL for each signal generator may be implemented.

In an exemplary embodiment, components in the phase shift circuitry 281 may comprise one or more adjustable or variable phased array elements, and may receive one or more control signals from the data processor 210 over connection 294 and operate the adjustable or variable phased array elements based on the received control signals.

In an exemplary embodiment, the phase shift circuitry 281 comprises phase shifters 283 and phased array elements 287. Although three phase shifters 283 and three phased array elements 287 are shown for ease of illustration, the phase shift circuitry 281 may comprise more or fewer phase shifters 283 and phased array elements 287.

Each phase shifter 283 may be configured to receive the RF transmit signal from the upconverter 275, alter the phase by an amount, and provide the RF signal to a respective phased array element 287. Each phased array element 287 may comprise transmit and receive circuitry including one or more filters, amplifiers, driver amplifiers, and/or power amplifiers. In some embodiments, the phase shifters 283 may be incorporated within respective phased array elements 287.

The output of the phase shift circuitry 281 is provided to an antenna array 248. In an exemplary embodiment, the antenna array 248 comprises a number of antennas that typically correspond to the number of phase shifters 283 and phased array elements 287, for example such that each antenna element is coupled to a respective phased array element 287. In an exemplary embodiment, the phase shift circuitry 281 and the antenna array 248 may be referred to as a phased array.

In a receive direction, an output of the phase shift circuitry 281 is provided to a downconverter 285. In an exemplary embodiment, the downconverter 285 may comprise an I/Q generation function 291 and a downconversion mixer 286. In an exemplary embodiment, the mixer 286 downconverts the receive RF signal provided by the phase shift circuitry 281 to an IF signal according to RX RF LO signals provided by an RX RF LO signal generator 279. The I/Q generation function 291 receives the IF signal from the mixer 286 and generates I and Q signals for the downconverter 260, which downconverts the IF signals to baseband, as described above. While PLL 282 is illustrated in FIG. 2B as being shared by the signal generators 280, 279, a respective PLL for each signal generator may be implemented.

In some embodiments, the upconverter 275, downconverter 285, and the phase shift circuitry 281 are implemented on a common IC. In some embodiments, the summing function 278 and the I/Q generation function 291 are implemented separate from the mixers 276 and 286 such that the mixers 276, 286 and the phase shift circuitry 281 are implemented on the common IC, but the summing function 278 and I/Q generation function 291 are not (e.g., the summing function 278 and I/Q generation function 291 are implemented in another IC coupled to the IC having the mixers 276, 286). In some embodiments, the LO signal generators 277, 279 are included in the common IC. In some embodiments in which phase shift circuitry is implemented on a common IC with 276, 286, 277, 278, 279, and/or 291, the common IC and the antenna array 248 are included in a module, which may be coupled to other components of the transceiver 220 via a connector. In some embodiments, the phase shift circuitry 281, for example, a chip on which the phase shift circuitry 281 is implemented, is coupled to the antenna array 248 by an interconnect or both are mounted to a substrate. For example, components of the antenna array 248 may be implemented on a substrate and coupled to an integrated circuit implementing the phase shift circuitry 281 via a flexible printed circuit or the integrated circuit may be mounted to an opposite side of the substrate.

In some embodiments, both the architecture illustrated in FIG. 2A and the architecture illustrated in FIG. 2B are implemented in the same device. For example, a wireless device 110 or 200 may be configured to communicate with signals having a frequency below about 20 GHz using the architecture illustrated in FIG. 2A and to communicate with signals having a frequency above about 20 GHz using the architecture illustrated in FIG. 2B. In devices in which both architectures are implemented, one or more components of FIGS. 2A and 2B that are identically numbered may be shared between the two architectures. For example, both signals that have been downconverted directly to baseband from RF and signals that have been downconverted from RF to baseband via an IF stage may be filtered by the same baseband filter 264. In other embodiments, a first version of the filter 264 is included in the portion of the device which implements the architecture of FIG. 2A and a second version of the filter 264 is included in the portion of the device which implements the architecture of FIG. 2B. While certain example frequencies are described herein, other implementations are possible. For example, signals having a frequency above about 20 GHz (e.g., having a mmW frequency) may be transmitted and/or received using a direct conversion architecture. In such embodiments, for example, a phased array may be implemented in the direct conversion architecture.

Figure 2C:
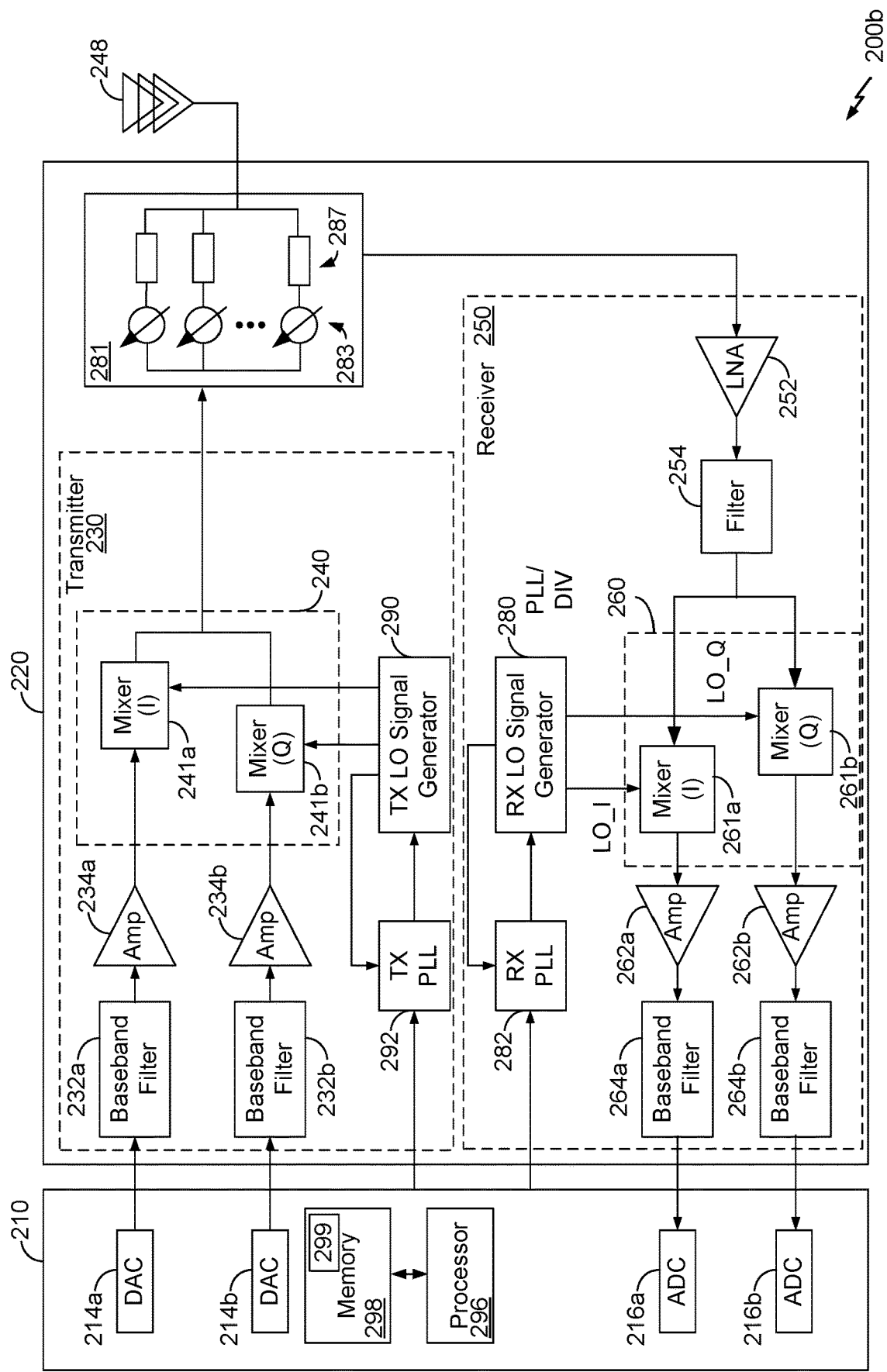
FIG. 2C is a block diagram showing a wireless device in which exemplary techniques of the present disclosure may be implemented.

FIG. 2C is a block diagram showing a wireless device in which exemplary techniques of the present disclosure may be implemented. Certain components, for example which may be indicated by identical reference numerals, of the wireless device 200b in FIG. 2C may be configured similarly to those in the wireless device 200 shown in FIG. 2A and/or the wireless device 200a shown in FIG. 2B and the description of identically numbered items in FIG. 2C will not be repeated.

The wireless device 200b in FIG. 2C incorporates the phase shift circuitry 281 (of FIG. 2B) in a direct conversion architecture, where mmW transmission signals are upconverted and downconverted between baseband and RF without the use of intermediate frequency (IF) signal conversion. For example, the LO signals in the architecture of FIG. 2C may comprise signals at frequencies of tens of GHz.

In some embodiments, the upconverter 240, downconverter 260, and the phase shift circuitry 281 are implemented on a common IC. In some embodiments, the LO signal generators 280, 290 are included in the common IC. In some embodiments, the common IC and the antenna array 248 are included in a module, which may be coupled to other components of the transceiver 220 via a connector. In some embodiments, the phase shift circuitry 281, for example, a chip on which the phase shift circuitry 281 is implemented, is coupled to the antenna array 248 by an interconnect or both are mounted to a substrate. For example, components of the antenna array 248 may be implemented on a substrate and coupled to an integrated circuit implementing the phase shift circuitry 281 via a flexible printed circuit or the integrated circuit may be mounted to an opposite side of the substrate.

Figure 3:
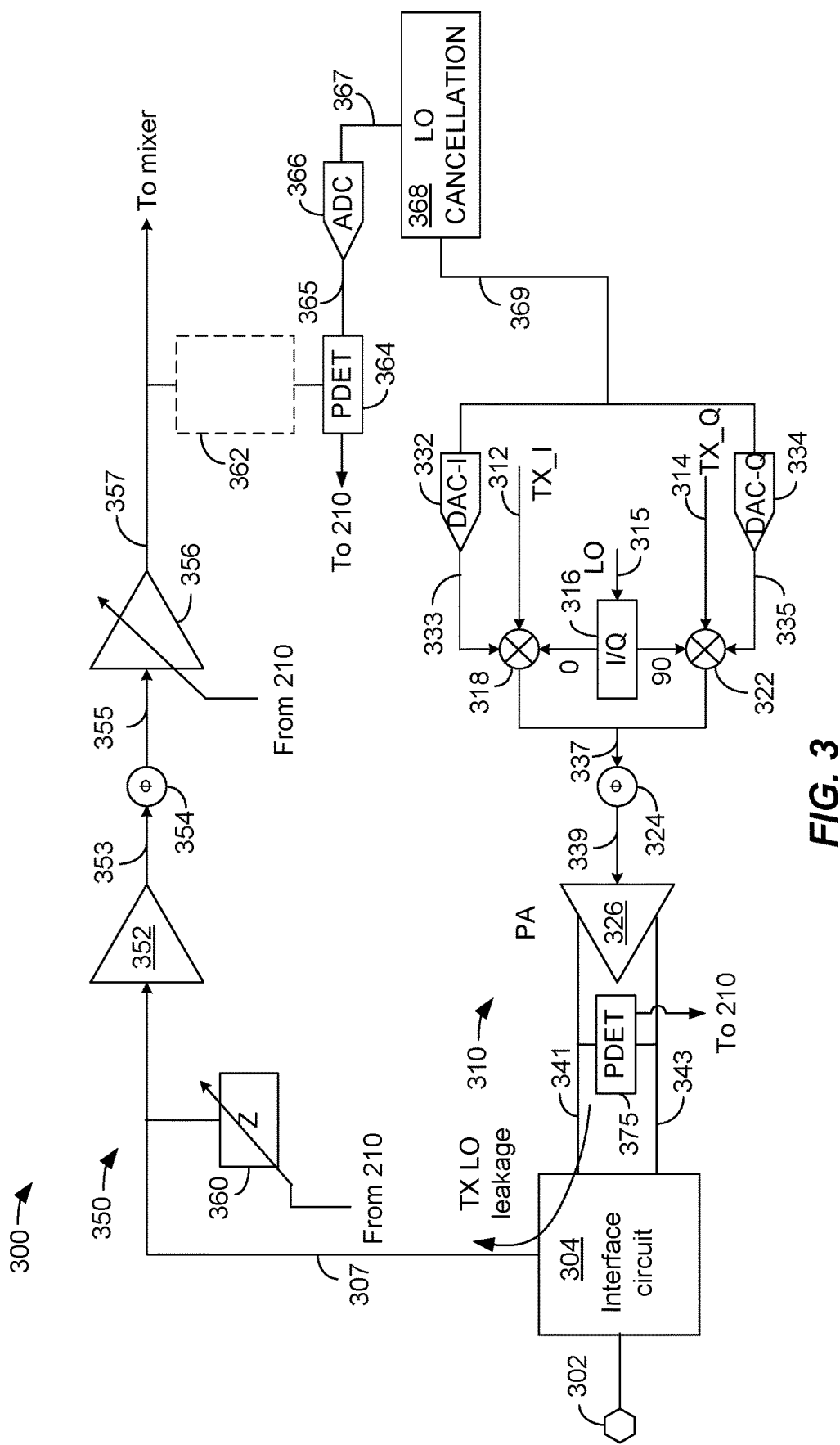
FIG. 3 is a block diagram of a TX LO calibration circuit in accordance with an exemplary embodiment of the disclosure.

FIG. 3 is a block diagram of a TX LO calibration circuit 300 in accordance with an exemplary embodiment of the disclosure. In an exemplary embodiment, the TX LO calibration circuit 300 includes portions of a transmit section 310 and a receive section 350. The transmit section 310 and the receive section 350 may be part of a transceiver, such as the transceiver 220 of FIG. 2C. In some embodiments, some elements of the transmit section 310 and the receive section 350 may reside on the phase shift circuitry 281 of FIG. 2C. In some embodiments, all of the elements illustrated in FIG. 3 are disposed on the common IC described above. Thus, in some embodiments, calibration may be implemented and performed at an RFIC, without requiring signals to be communicated from the RFIC to baseband circuitry. In other embodiments, only signals associated with power detection are communicated between the RFIC and baseband circuitry. In some such embodiments, the power detection signals are at a much lower frequency than the LO signals processed by the calibration circuit 300 (or are DC signals), and thus all mmW signals can be contained within and processed the RFIC.

The transmit section 310 and the receive section 350 may be connected to an interface circuit 304. The interface circuit 304 may be connected to a circuit pad 302, which may be implemented as a bump on an IC, and which may be connected to other circuit elements and/or to one or more antennas. In some embodiments, a power detector (PDET) 375 may be located at an output of the power amplifier 326 across connections 341 and 343.

In an exemplary embodiment, the interface circuit 304 may comprise one or more magnetic elements, such as inductances, capacitances, resistances, etc., and may be configured to provide an interface between the transmit section 310 and the circuit pad 302; and may be configured to provide an interface between the receive section 350 and the circuit pad 302.

In an exemplary embodiment, the interface circuit 304 may also be configured to provide a connection between the transmit section 310 and the receive section 350. For example, under certain conditions, the interface circuit 304 may be configured to provide a transmit signal from the transmit section 310 to the receive section 350. For example, in an exemplary embodiment in a TX LO leakage calibration mode, portions of the receive section 350 may be configured to process a signal from the transmit section 310 in order to determine TX LO signal power leakage and to provide TX LO signal leakage detection and calibration. Such a TX LO leakage calibration mode may comprise a mode where selected elements of the transmit section 310 and selected elements of the receive section 350 are active at the same time. In an exemplary embodiment, a transmit signal having TX LO leakage is directed from the transmit section 310 to the receive section 350, where the receiver having the receive section 350 is co-located with the transmitter having the transmit section 310 from which the transmit signal is directed.

In an exemplary embodiment, the transmit section 310 may comprise a digital-to-analog converter 332, a DAC 334, a quadrature generator 316, a mixer 318, a mixer 322, a phase shifter 324, and a power amplifier 326. In an exemplary embodiment, the DAC 332 (DAC-I) may be configured to process an in-phase signal and the DAC 334 (DAC-Q) may be configured to process a quadrature signal.

In an exemplary embodiment, the transmit section 310 may comprise a connection 312 configured to provide a baseband information signal comprising an in-phase signal component to the mixer 318. Similarly, the transmit section 310 may comprise a connection 314 configured to provide a baseband information signal comprising a quadrature signal component to the mixer 322. A local oscillator (LO) signal may be provided over a connection 315 to the quadrature generator 316. The LO signal may be provided by, for example, the TX LO signal generator 290 of FIG. 2C, or another LO signal generator. The mixers 318, 322 may be examples of the mixers 241a, 241b.

In an exemplary embodiment, the quadrature generator 316 may provide a 0 degree phase signal to the mixer 318 and may be configured to provide a 90 degree phase signal to the mixer 322. However, other phase shift amounts are possible.

In an exemplary embodiment, the mixer 318 combines the in-phase baseband information signal on connection 312 with the 0 degree phase shifted LO signal from the quadrature generator 316 to provide an upconverted (RF) in-phase signal over connection 337 to the phase shifter 324.

In an exemplary embodiment, the mixer 322 combines the quadrature baseband information signal on connection 314 with the 90 degree phase shifted LO signal from the quadrature generator 316 to provide an upconverted (RF) quadrature signal over connection 337 to the phase shifter 324.

In an exemplary embodiment, the phase shifter 324 alters the phase of the signal on connection 337 and provides a transmit signal on connection 339 to the power amplifier 326. The phase shifter 324 may be controlled by a signal from the data processor 210 or another (e.g., local) controller.

The power amplifier 326 amplifies the transmit signal and provides a differential transmit signal on connection 341 and connection 343 to the interface circuit 304. While one PA and one phase shifter are shown in the illustrated example, output signals from the mixers 318, 322 in other examples may be split and provided to multiple paths each having a PA, phase shifter, bump, and corresponding receive section.

In an exemplary embodiment, the receive section 350 may comprise an impedance control circuit 360, low noise amplifier (LNA) 352, a phase shifter 354, an RF variable gain amplifier (RF-VGA) 356, an optional narrow-band tunable bandpass buffer 362, a power detector (PDET) 364, an analog-to-digital converter (ADC) 366 and an LO cancellation element 368.

In an exemplary embodiment, in a TX LO calibration mode a signal may be provided from the transmit section 310 via the interface circuit 304 over connection 307 to the LNA 352. In an exemplary embodiment, the signal provided over connection 307 may comprise a transmit signal provided by the transmit section 310, the transmit signal occurring in a TX LO calibration mode and provided to the receive section 350 in order to determine TX LO leakage. For example, the signal provided from the transmit section 310 over connection 307 to the LNA 352 may comprise a signal representative of leakage from the TX LO signal generator 290 (FIG. 2C).

In an exemplary embodiment, the impedance control circuit 360 may comprise one or more switchable and/or variable capacitances, resistances and inductances configured to alter the impedance at the input to the LNA 352 so that the signal on connection 307 provided to the LNA 352 resembles a transmit signal in normal operational mode (also referred to as mission mode). For example, the impedance control circuit 360 at the input to the LNA 352 in TX LO leakage calibration mode can be configured to cause a TX signal in the TX LO leakage calibration mode to closely resemble or approximate a mission mode TX signal. In this manner, TX LO leakage at the interface circuit 304 will resemble and be representative of TX LO leakage in mission mode. In an exemplary embodiment, the impedance control circuit 360 may be controlled by a signal from the data processor 210 (FIG. 2C) or another controller.

In an exemplary embodiment, the TX LO calibration circuit 300 operates in a mmW communication system which may be implemented as a time division duplex (TDD) system. In such a TDD system, the LNA 352 comprises a configurable input so that the LNA 352 can be protected from large voltage swings when the transceiver is in TX mode and still be able to detect a small signal with a low noise figure in the RX mode. In such an application, in TX LO calibration mode the signal from the transmit section 310 is very low in power since it represents TX LO leakage only. This allows the input to the LNA 352 to be reconfigured in a way that ignores large input voltage swings such that the loading to the power amplifier 326 is not altered, while still being representative of a mission mode TX signal, and also allowing the LNA 352 to be able to sense and amplify the TX LO leakage for detection. In this manner, the shape of the impedance response over frequency for the power amplifier 326 is maintained so as to not cause attenuation or peaking of the TX LO leakage signal that could result in inaccurate correction and which would not be representative of TX LO leakage for a mission mode TX signal.

In an exemplary embodiment, the impedance control circuit 360 may be configured to maintain a similar input impedance at the LNA 352 when the LNA 352 is off as when the LNA 352 is on. In some embodiments, the impedance control circuit 360 may be configured to selectively apply a transmit signal from the transmit portion 310 directly to the LNA 352 in the receive portion 350 by controlling the impedance at connection 307.

In an exemplary embodiment, the LNA 352 can be configured for operation in 3 modes: (1) RX mode (power amplifier is off and LNA is on) (2) TX mission mode (power amplifier is on and LNA is off) and (3) TX LO calibration mode (which may also be referred to as a transmit receive (TRX) mode where power amplifier and LNA are on).

In an exemplary embodiment, a frequency response of a mission mode transmit signal is characterized and a frequency response of a transmit signal in a TX LO leakage calibration mode is characterized. For example, a mission mode TX signal may be provided from the power amplifier 326 to the interface circuit 304 and to the circuit pad 302. An output of the power detector (PDET) 375 may also be provided to the data processor 210 (FIG. 2C) to determine the frequency response of a mission mode TX signal, or to a processor local to a chip on which the PDET 375 is implemented. Then, during TX LO calibration mode, the frequency response measurement is repeated by the power detector (PDET) 375 and the data processor 210 (FIG. 2C) or local processor so that the impedance provided by the impedance control circuit 360 can be adjusted so that the frequency response of the TX LO leakage signal that appears at the output of the power amplifier 326 in TX LO calibration mode matches (or closely approximates) the frequency response of the mission mode TX signal at the output of the power amplifier 326. This ensures that the TX LO leakage signal at the output of the power amplifier 326 is approximately the same between TX mission mode and TX LO calibration mode. In this manner, a frequency response of a TX LO leakage signal that appears at the connection 357 in TX LO leakage calibration mode approximates the frequency response of the mission mode TX signal. In this manner, the TX LO calibration circuit 300 can provide a signal at connection 357 having TX LO leakage that closely approximates a mission mode TX signal so that an appropriate amount of TX LO correction can be determined and applied. In an exemplary embodiment, the adjustment of the impedance provided by the impedance control circuit 360 allows the frequency response of the TX LO leakage signal to closely match the frequency response of the transmit signal in mission mode.

In an exemplary embodiment, an output of the LNA 352 on connection 353 is provided to the phase shifter 354. The phase shifter 354 provides a phase shifted signal over connection 355 to the RF-VGA 356. The phase shifter 354 may be controlled by a signal from the data processor 210 (FIG. 2C) or another controller. In an exemplary embodiment, the RF-VGA 356 may be adjustable and may be controlled by a signal from the data processor 210 (FIG. 2C) or another controller. In TX LO calibration mode, the intended output of the RF-VGA on connection 357 is a signal having only the LO tone (or frequency) in this exemplary embodiment and can be used to determine TX LO signal leakage.

In an exemplary embodiment, the signal on connection 357 is provided to an optional narrow-band tunable bandpass buffer 362. The optional narrow-band tunable bandpass buffer 362 may be used when the system gain is low and/or one or more spurious (spurs) are present at a frequency in the vicinity of the frequency of the LO signal on connection 357. In some embodiments, the optional narrow-band tunable bandpass buffer 362 may be omitted where the strength of the signal on connection 357 falls within the range of detectability by the power detector (PDET) 364.

The signal on connection 357 (or the output of the optional narrow-band tunable bandpass buffer 362 if present) is provided to the power detector (PDET) 364. The power detector (PDET) 364 and the data processor 210 determine the power level and the frequency response of the signal on connection 357, and provides an output over connection 365 to the ADC 366. In other embodiments, a processor local to a chip on which the PDET 364 is implemented (which may be the same local processor as mentioned above) assists with determining the power level and frequency response and providing the output over connection 365. The signal on connection 365 is a DC signal that is proportional to the amount of LO leakage detected by the power detector (PDET) 364. In an exemplary embodiment, the narrow band tunable bandpass buffer 362 can be configured to filter unwanted signals from the signal on connection 357 so that the power detector 364 can detect the LO tone because the power detector 364 generally does not discern signals between multiple frequencies. In an exemplary embodiment, because the power detector 364 has finite sensitivity to detect a signal, the RF-VGA 356 provides amplification so that the signal on connection 357 falls within the detection range of the power detector 364.

In an exemplary embodiment, the impedance control circuit 360 may be configured such that the signal characteristics (e.g., frequency response) at the input to the power detector (PDET) 364 match, or closely approximate, the signal characteristics of a mission mode transmit signal at the output of the power amplifier 326, as described above. For example, the TX LO leakage can be measured at the output of the power amplifier 326 in TX mission mode and in TX LO calibration mode as described above. In this manner, the TX LO leakage measured by the power detector 364 in TX LO calibration mode after the TX LO signal is processed by the LNA 352, phase shifter 354 and RF-VGA 356 can be compensated.

In an exemplary embodiment, the LO leakage appearing at the output of the power amplifier 326 is typically small and cannot be detected by the power detector (PDET) 364 without some amplification and/or signal processing. Therefore, in TX LO leakage mode, the signal at the output of the power amplifier 326 is provided to the LNA 352 (without altering the impedance presented to the power amplifier 326) so as to keep the value of LO leakage at the output of the power amplifier 326 consistent between TX mission mode and TX LO calibration mode.

In some embodiments, the output of the LNA 352 may be provided directly to the power detector 364 bypassing the phase shifter 354 and RF-VGA 356 (or to the optional narrow-band tunable bandpass buffer 362 if present) if the power of the signal provided by the LNA 352 on connection 353 falls within the detection range of the power detector (PDET) 364. In other embodiments, the output of the phase shifter 354 may directly be provided to the power detector 364 (or to the optional narrow-band tunable bandpass buffer 362 if present) if the power of the signal provided by the phase shifter 354 on connection 355 falls within the detection range of the power detector 364.

In an exemplary embodiment, the power detector (PDET) 364 measures the signal at connection 357, which includes the gain of the LNA 352, phase shifter 354, and RF-VGA 356 such that the power detector (PDET) 364 can detect the signal at connection 357 having TX LO leakage before and after correction.

The ADC 366 provides a digital value that is proportional to the DC signal on connection 365. The LO cancellation element 368 receives the digital value on connection 367 and develops a DC offset value that is provided to the DAC 332 and the DAC 334 over connection 369.

The DC offset value is provided from the DAC 332 over connection 333 to the mixer 318 and the DC offset value is provided from the DAC 334 over connection 335 to the mixer 322. A DC offset introduced to the mixer 318 and the mixer 322 results in a LO tone at the output of the mixers 318 and 322 on connection 337. The LO output on connection 337 is a vector sum of the LO leakage from the mixer 318 (the I mixer) and the mixer 322 (the Q mixer). Accordingly, the signal on connection 369 can provide different DC offsets for application to the mixer 318 and the mixer 322, resulting in a high or low effective LO tone at the output on connection 337. The value of the DC offsets provided on connection 369 that results in a minimum value of the LO leakage on connection 337 is stored in the transceiver device memory, (e.g., read only memory (ROM)), such as in the memory 298 (FIG. 2C). In this manner, any LO leakage on the signal on connection 305 may be corrected by altering the signal that is provided by the mixer 318 and the mixer 322.

In an exemplary embodiment, the TX LO leakage calibration described herein occurs at mmW frequencies, and the TX LO signal on connection 357 has not yet passed through a mixer, which minimizes any mixer-induced non-idealities.

Figure 4:
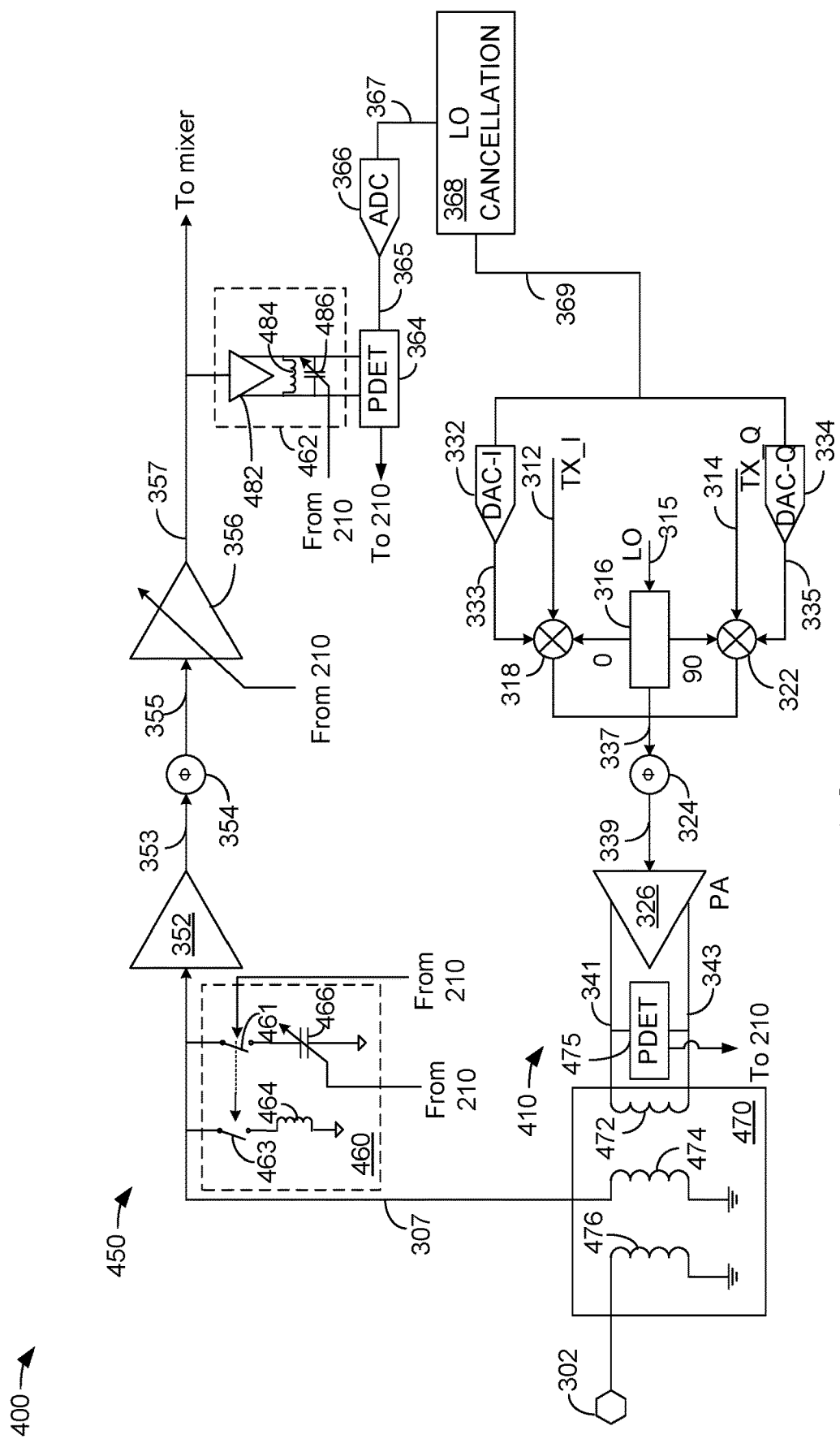
FIG. 4 is a block diagram of a TX LO calibration circuit in accordance with an exemplary embodiment of the disclosure.

FIG. 4 is a block diagram of a TX LO calibration circuit 400 in accordance with an exemplary embodiment of the disclosure. Elements in FIG. 4 that are identical to elements in FIG. 3 are labeled with the same reference numerals. Elements in FIG. 4 that may have a similar function as an element in FIG. 3 or be an example implementation of an element in FIG. 3 are referred to using the nomenclature 4XX, where an element in FIG. 4 labeled 4XX corresponds to an element in FIG. 3 labeled 3XX.

In an exemplary embodiment, the TX LO calibration circuit 400 includes portions of a transmit section 410 and a receive section 450. The transmit section 410 and the receive section 450 may be part of a transceiver, such as the transceiver 220 of FIG. 2C. The transmit section 410 and the receive section 450 may be connected to an interface circuit 470. The interface circuit 470 may be connected to a circuit pad 302, which may be implemented as a bump, and which may be connected to other circuit elements and/or to one or more antennas.

In an exemplary embodiment, the interface circuit 470 may comprise inductances 472, 474 and 476, and may be configured to provide an interface between the transmit section 410 and the circuit pad 302; and may be configured to provide an interface between the receive section 450 and the circuit pad 302. A power detector (PDET) 475 may be connected across the inductance 472 at the output of the power amplifier 326.

In an exemplary embodiment, the interface circuit 470 may also be configured to provide a connection between the transmit section 410 and the receive section 450. For example, under certain conditions, the interface circuit 470 may be configured to provide a transmit signal from the transmit section 410 to the receive section 450. For example, in an exemplary embodiment, in a TX LO leakage calibration mode, portions of the receive section 450 may be configured to process a signal from the transmit section 410 in order to determine TX LO signal power leakage and to provide TX LO signal leakage calibration. Such a calibration mode may comprise a mode where selected elements of the transmit section 410 and selected elements of the receive section 450 are active at the same time.

In an exemplary embodiment, the inductances 472, 474 and 476 in the interface circuit 470 may be magnetically coupled. For example, the inductances 472, 474 and 476 may form what is referred to as a tri-coil. In an exemplary embodiment, in a transmit mode, the inductance 472 and the inductance 476 may be electromagnetically coupled so that a transmit signal is provided from the power amplifier 326 to the circuit pad 302. In an exemplary embodiment, in a receive mode, the inductance 474 and the inductance 476 may be electromagnetically coupled so that a receive signal is provided from the circuit pad 302 to the input of the LNA 352. In an exemplary TX LO calibration mode, the inductance 472 and the inductance 474 may be electromagnetically coupled so that a transmit signal is provided from the power amplifier 326 to the input of the LNA 352, where the TX signal represents TX LO leakage.

In an exemplary embodiment, the impedance control circuit 460 may comprise switches 461 and 463, and may comprise an adjustable capacitance 466 and a fixed inductance 464. In an exemplary embodiment, the adjustable capacitance 466 may be connected to the switch 461 and the fixed inductance 464 may be connected to the switch 463. In an exemplary embodiment, the adjustable capacitance 466 may be switchably or selectively connected to the input of the LNA 352 on connection 307 through the switch 461. Similarly, the fixed inductance 464 may be switchably or selectively connected to the input of the LNA 352 on connection 307 through the switch 463. Although shown as simple single pole single pole switches, the switches 461 and 463 may be configured in a number of ways to provide variable resistance in series with the adjustable capacitance 466 and the fixed inductance 464.

In an exemplary embodiment, the switches 461 and 463, and the adjustable capacitance 466 may be controlled by a signal from the data processor 210 (FIG. 2C) or another (e.g., local) controller.

In an exemplary embodiment, the values of the adjustable capacitance 466 and fixed inductance 464 may be configured to alter the impedance at the input to the LNA 352 so that a TX LO leakage signal in TX LO leakage calibration mode on connection 307 provided to the LNA 352 resembles a transmit signal in normal operational mode (also referred to as mission mode), as described herein. For example, the impedance control circuit 460 at the input to the LNA 352 in calibration mode can be configured to allow a TX signal in TX LO leakage calibration mode appear like a mission mode TX signal, as described herein. In this manner, TX LO leakage at the interface circuit 470 will resemble and be representative of TX LO leakage in mission mode so that TX LO leakage may be compensated by calibration as described herein. In an exemplary embodiment, the impedance control circuit 460 may be configured such that the signal characteristics at the input to the power detector 364 on connection 357 in TX LO calibration mode match the characteristics of a mission mode transmit signal at the output of the power amplifier 326, as described above.

In an exemplary embodiment, the TX LO calibration circuit 400 may include an optional narrow-band tunable bandpass buffer 462. The narrow-band tunable bandpass buffer 462 is an example of the narrow-band tunable bandpass buffer 362. In an exemplary embodiment, the optional narrow-band tunable bandpass buffer 462 may include an amplifier 482, an inductance 484 and an adjustable capacitance 486. The adjustable capacitance 486 may be controlled by a control signal from the data processor 210 (FIG. 2C), or another controller. In an exemplary embodiment, the narrow-band tunable bandpass buffer 462 may be configured to provide signal buffering (and/or amplification) and frequency adjustability using the adjustable capacitance 486.

The signal on connection 357 (or the output of the optional narrow-band tunable bandpass buffer 462 if present) is provided to the power detector (PDET) 364, and then processed by the ADC 366 and LO cancellation element 368 as described with respect to FIG. 3.

Figure 5:
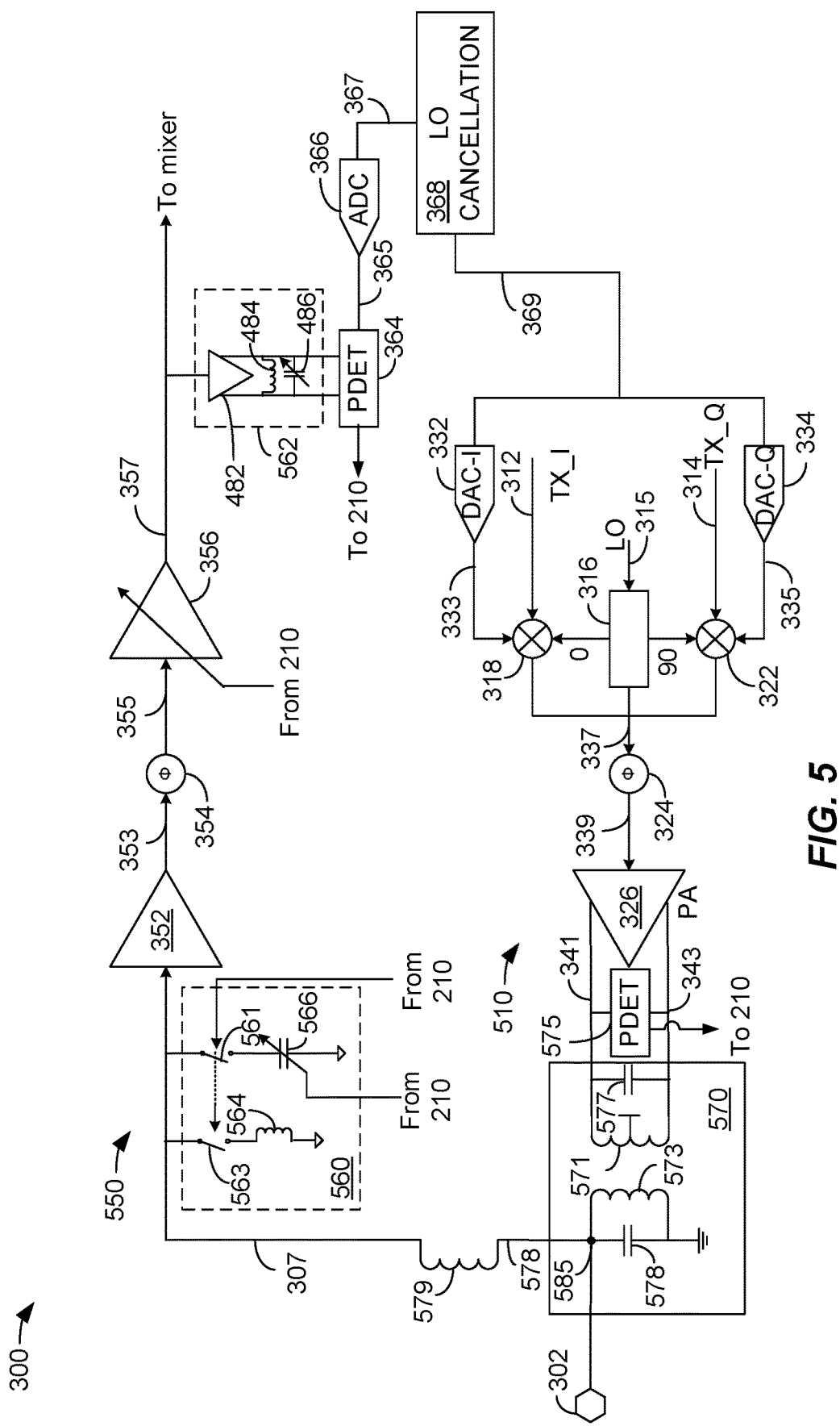
FIG. 5 is a block diagram of a TX LO calibration circuit in accordance with an exemplary embodiment of the disclosure.

FIG. 5 is a block diagram of a TX LO calibration circuit 500 in accordance with an exemplary embodiment of the disclosure. Elements in FIG. 5 that are identical to elements in FIG. 3 and FIG. 4 are labeled with the same reference numerals. Elements in FIG. 5 that may have a similar function as an element in FIG. 3 or 4, or be an example implementation of an element in FIG. 3 or 4, are referred to using the nomenclature 5XX, where an element in FIG. 5 labeled 5XX corresponds to an element in FIG. 3 labeled 3XX or to an element 4XX in FIG. 4.

In an exemplary embodiment, the TX LO calibration circuit 500 includes portions of a transmit section 510 and a receive section 550. The transmit section 510 and the receive section 550 may be part of a transceiver, such as the transceiver 220 of FIG. 2C. The transmit section 510 and the receive section 550 may be connected to an interface circuit 570. The interface circuit 570 may be connected to a circuit pad 302, which may be implemented as a bump, and which may be connected to other circuit elements and/or to one or more antennas.

In an exemplary embodiment, the interface circuit 570 may comprise inductances 571 and 573, and may be configured to provide an interface between the transmit section 510 and the circuit pad 302; and that may be configured to provide an interface between the receive section 550 and the circuit pad 302.

In an exemplary embodiment, the interface circuit 570 may also comprise a capacitance 577 connected across the inductance 571 and a capacitance 578 connected across the inductance 573.

In an exemplary embodiment, the interface circuit 570 may also be configured to provide a connection between the transmit section 510 and the receive section 550. For example, under certain conditions, the interface circuit 570 may be configured to provide a transmit signal from the transmit section 510 over connection 578 and inductance 579 to the receive section 550 over connection 307. For example, in an exemplary embodiment, in a TX LO leakage calibration mode, portions of the receive section 550 may be configured to process a signal from the transmit section 510 in order to determine LO signal power leakage and to provide LO signal leakage calibration. Such a calibration mode may comprise a mode where selected elements of the transmit section 510 and selected elements of the receive section 550 are active at the same time.

In an exemplary embodiment, the inductances 571 and 573 in the interface circuit 570 may be magnetically coupled so that a transmit signal is provided from the power amplifier 326 to the circuit pad 302. In an exemplary embodiment, in a receive mode, the inductance 579 may be configured to provide a receive signal from the circuit pad 302 to the input of the LNA 352.

In an exemplary TX LO calibration mode, the inductance 571 and the inductance 573 may be electromagnetically coupled so that a transmit signal is provided from the power amplifier 326 to the input of the LNA 352 through the inductance 579, where the TX signal represents TX LO leakage.

In an exemplary embodiment, the impedance control circuit 560 may comprise switches 561 and 563, and may comprise an adjustable capacitance 566 and a fixed inductance 564. In an exemplary embodiment, the adjustable capacitance 566 may be connected to the switch 561 and the fixed inductance 564 may be connected to the switch 563. In an exemplary embodiment, the adjustable capacitance 566 may be switchably or selectively connected to the input of the LNA 352 on connection 307 through the switch 561. Similarly, the fixed inductance 564 may be switchably or selectively connected to the input of the LNA 352 on connection 307 through the switch 563. Although shown as simple single pole single pole switches, the switches 561 and 563 may be configured in a number of ways to provide variable resistance in series with the adjustable capacitance 566 and the fixed inductance 564.

In an exemplary embodiment, the switches 561 and 563, and the adjustable capacitance 566 may be controlled by a signal from the data processor 210 (FIG. 2C) or another (e.g., local) controller.

In an exemplary embodiment, the values of the adjustable capacitance 566 and fixed inductance 564 may be configured to alter the impedance at the input to the LNA 352 so that the TX LO calibration signal on connection 307 provided to the LNA 352 resembles a transmit signal in normal operational mode (also referred to as mission mode). For example, the impedance control circuit 560 at the input to the LNA in TX LO calibration mode can be configured to allow a TX signal in TX LO calibration mode to resemble a mission mode TX signal. In this manner, LO leakage at the interface circuit 570 will resemble and be representative of TX LO leakage in mission mode so that TX LO leakage may be compensated by calibration.

The signal on connection 357 (or the output of the optional narrow-band tunable bandpass buffer 462 if present) is provided to the power detector (PDET) 364, and then processed by the ADC 366 and LO cancellation element 368 as described with respect to FIG. 3.

Figure 6:
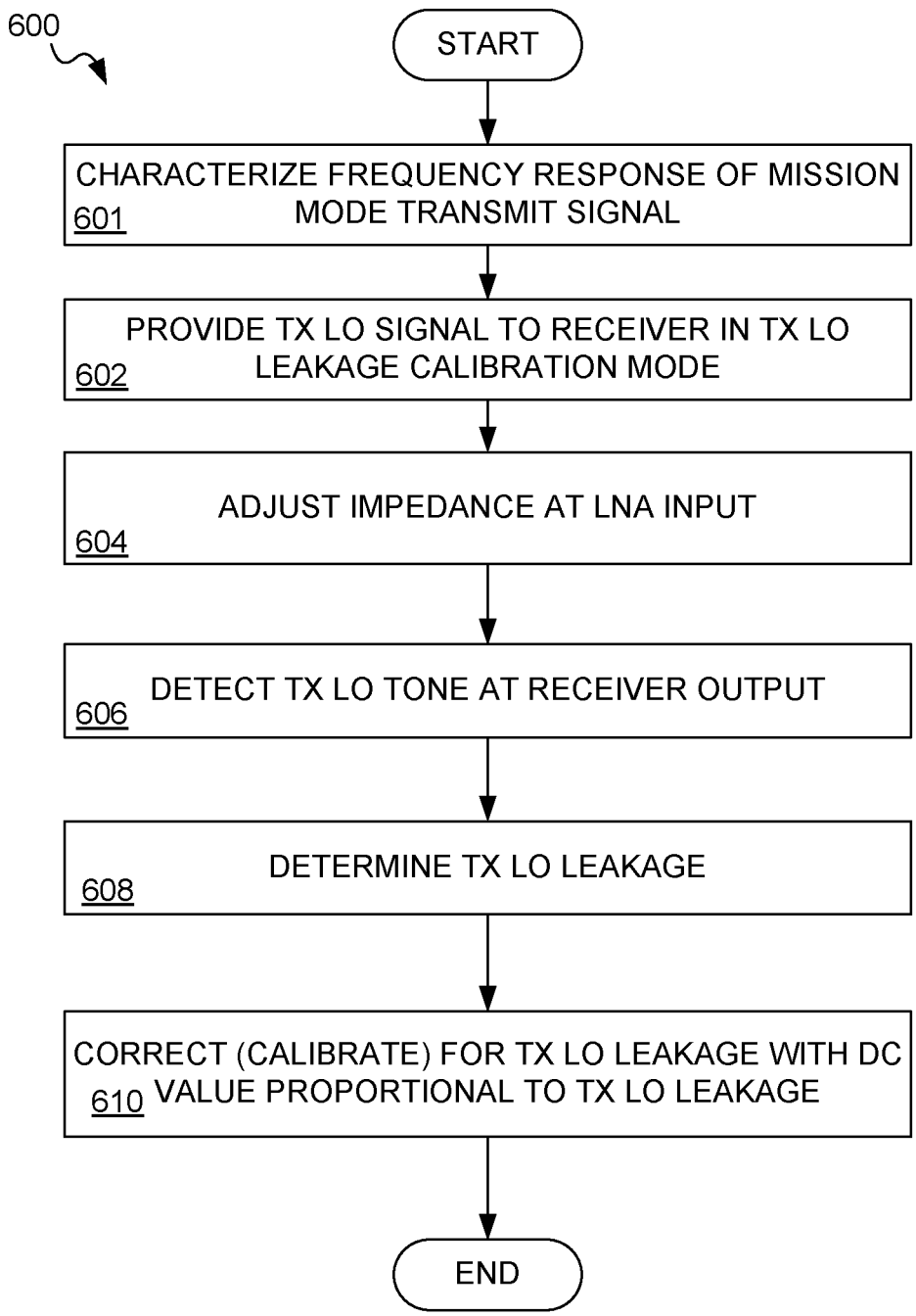
FIG. 6 is a flow chart describing an example of the operation of a method for TX LO calibration.

FIG. 6 is a flow chart 600 describing an example of the operation of a method for TX LO calibration. The blocks in the method 600 can be performed in or out of the order shown, and in some embodiments, can be performed at least in part in parallel.

In block 601, a mission mode transmit signal may be characterized. For example, a mission mode transmit signal appearing at the output of the power amplifier 326 may be processed by the power detector (PDET) 375 and the data processor 210 (or a local processor) to determine a frequency response.

In block 602, a transmit signal comprising a TX LO signal may be provided to a receiver in a TX LO leakage calibration mode. For example, the interface circuit 304 (FIG. 3), the interface circuit 470 (FIG. 4) or the interface circuit 570 (FIG. 5) may provide a signal to the receiver section, the signal representing TX LO leakage at the output of the power amplifier 326. The signal will resemble and be representative of TX LO leakage in mission mode so that TX LO leakage may be compensated by calibration.

In block 604, an impedance at an input to a low noise amplifier (LNA) is adjusted. For example, the impedance control circuit 360 (FIG. 3), the impedance control circuit 460 (FIG. 4) or the impedance control circuit 560 (FIG. 5) may be adjusted so that the signal presented to the input of the LNA 352 in TX LO calibration mode makes a TX signal in TX LO leakage calibration mode resemble a mission mode TX signal having LO leakage.

In block 606, a TX LO signal (tone) is detected at a receiver output. For example, an output of the RF-VGA 356 on connection 357 is detected that may contain a signal having TX LO leakage.

In block 608, TX LO leakage is determined. For example, the power detector 364 and the data processor 210 (or a local processor) measure the power and frequency response of the signal on connection 357 and the measured power and frequency response is representative of TX LO leakage.

In block 610, TX LO leakage is compensated. For example, the ADC 366 provides a digital value that is proportional to the DC signal provided by the power detector 364. The LO cancellation element 368 receives the digital value and develops a DC offset value that is provided to the DAC 332 and the DAC 334 over connection 369. The DC offset value is provided from the DAC 332 over connection 333 to the mixer 318 and the DC offset value is provided from the DAC 334 over connection 335 to the mixer 322. In this manner, any LO leakage on the signal on connection 307 may be corrected by altering the signal that is provided by the mixer 318 and the mixer 322.

Figure 7:
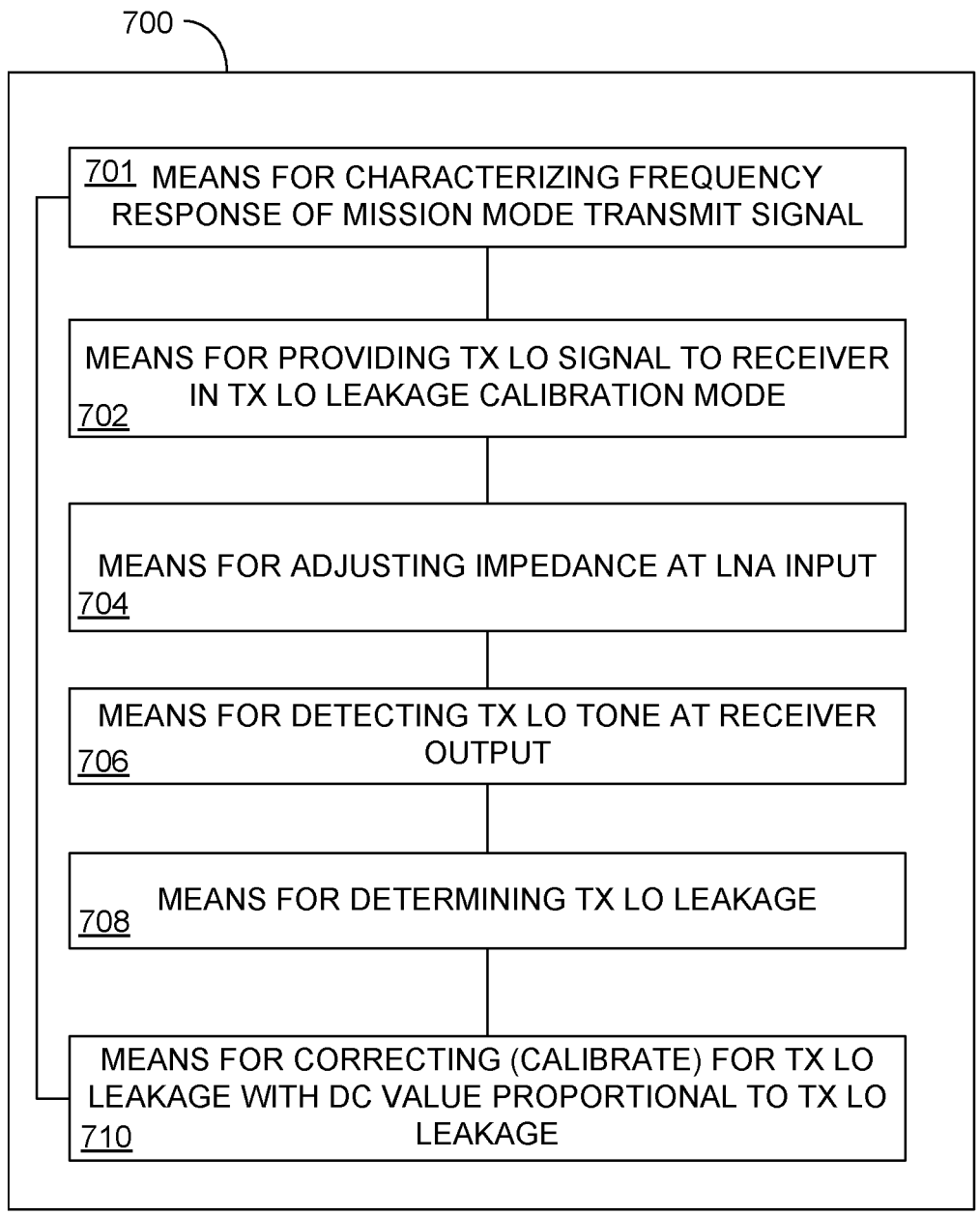
FIG. 7 is a functional block diagram of an apparatus for TX LO calibration.

FIG. 7 is a functional block diagram of an apparatus 700 for TX LO calibration. The apparatus 700 comprises means 701 for characterizing a mission mode transmit signal. In certain embodiments, the means 701 for characterizing a mission mode transmit signal can be configured to perform one or more of the functions described in operation block 601 of method 600 (FIG. 6). In an exemplary embodiment, the means 701 for characterizing a mission mode transmit signal may comprise the power detector (PDET) 375 and the data processor 210 (or a local processor), for example configured to determine a frequency response of a mission mode transmit signal appearing at the output of the power amplifier 326.

The apparatus 700 may also comprise means 702 for providing a transmit signal comprising a TX LO signal to a receiver in a TX LO leakage calibration mode. In certain embodiments, the means 702 for providing a transmit signal comprising a TX LO signal to a receiver in a TX LO leakage calibration mode can be configured to perform one or more of the functions described in operation block 602 of method 600 (FIG. 6). In an exemplary embodiment, the means 702 for providing a transmit signal comprising a TX LO signal to a receiver in a TX LO leakage calibration mode may comprise the interface circuit 304 (FIG. 3), the interface circuit 470 (FIG. 4) or the interface circuit 570 (FIG. 5), for example configured to provide a signal to the receiver section, the signal representing TX LO leakage at the output of the power amplifier 326.

The apparatus 700 may also comprise means 704 for adjusting an impedance at an input to a low noise amplifier (LNA). In certain embodiments, the means 704 for adjusting an impedance at an input to a low noise amplifier (LNA) can be configured to perform one or more of the functions described in operation block 604 of method 600 (FIG. 6). In an exemplary embodiment, the means 704 for adjusting an impedance at an input to a low noise amplifier (LNA) may comprise the impedance control circuit 360 (FIG. 3), the impedance control circuit 460 (FIG. 4) or the impedance control circuit 560 (FIG. 5), for example configured to adjust an impedance so that the signal presented to the input of the LNA 352 in TX LO leakage calibration mode resembles a mission mode TX signal having LO leakage.

The apparatus 700 may also comprise means 706 for detecting a TX LO signal (tone) at a receiver output. In certain embodiments, the means 706 for detecting a TX LO signal (tone) at a receiver output can be configured to perform one or more of the functions described in operation block 606 of method 600 (FIG. 6). In an exemplary embodiment, the means 706 for detecting a TX LO signal (tone) at a receiver output may comprise the power detector 364, for example configured to detect an output of the RF-VGA 356 on connection 357 having LO leakage.

The apparatus 700 may also comprise means 708 for determining TX LO leakage. In certain embodiments, the means 708 for determining TX LO leakage can be configured to perform one or more of the functions described in operation block 608 of method 600 (FIG. 6). In an exemplary embodiment, the means 708 for determining TX LO leakage may comprise the power detector (PDET) 364 and/or the data processor 210 (or a local processor), for example configured to measure the power and frequency response of the signal on connection 357 where the measured power and frequency response is representative of TX LO leakage.

The apparatus 700 may also comprise means 710 for compensating TX LO leakage. In certain embodiments, the means 710 for compensating TX LO leakage can be configured to perform one or more of the functions described in operation block 610 of method 600 (FIG. 6). In an exemplary embodiment, the means 710 for compensating TX LO leakage may comprise the ADC 366, for example configured to provide a digital value that is proportional to the DC signal provided by the power detector 364. The LO cancellation element 368 receives the digital value and develops a DC offset value that is provided to the DAC 332 and the DAC 334 over connection 369.

Implementation examples are described in the following numbered clauses:

1. A transmit (TX) local oscillator (LO) leakage calibration circuit, comprising: a transceiver having a transmit portion and a receive portion; an interface circuit connected to the transmit portion and the receive portion; an impedance control circuit connected to a low noise amplifier (LNA) in the receive portion, the impedance control circuit configured to adjust an input impedance for the LNA; a power detector coupled to an output of the LNA; and a local oscillator cancellation element connected to the power detector, the local oscillator cancellation element configured to adjust an input to the transmit portion based on TX LO leakage detected by the power detector.

2. The TX LO leakage calibration circuit of clause 1, wherein the impedance control circuit is configured to maintain a same input impedance for the LNA when the LNA is off as when the LNA is on, the impedance control circuit configured to selectively apply a transmit signal from the transmit portion directly to the LNA in the receive portion.

3. The TX LO leakage calibration circuit of any of clauses 1 through 2, further comprising: a phase shifter connected to an output of the LNA; a radio frequency (RF)

variable gain amplifier (VGA) connected to an output of the phase shifter; a narrow band tunable bandpass buffer configured to receive an output of the VGA, wherein the narrow band tunable bandpass buffer is configured to provide an input to the power detector.

4. The TX LO leakage calibration circuit of any of clauses 1 through 3, wherein the interface circuit comprises a magnetic circuit having three inductances.

5. The TX LO leakage calibration circuit of any of clauses 1 through 4, wherein the interface circuit comprises a magnetic circuit having two inductances and further comprising a third inductance external to the interface circuit.

6. The TX LO leakage calibration circuit of any of clauses 1 through 5, wherein the impedance control circuit comprises a switched variable capacitance and a switched fixed inductance.

7. The TX LO leakage calibration circuit of clause 6, wherein the impedance control circuit comprises a first variable resistance in series with the switched variable capacitance and a second variable resistance in series with the switched fixed inductance.

8. The TX LO leakage calibration circuit of any of clauses 1 through 7, wherein the transmit signal from the transmit portion applied to the LNA in the receive portion comprises TX LO leakage.

9. The TX LO leakage calibration circuit of any of clauses 1 through 8, wherein the local oscillator cancellation element is configured to provide a DC offset to a mixer in the transmit portion.

10. The TX LO leakage calibration circuit of clause 9, wherein a value of the DC offset minimizes TX LO leakage.

11. A method for transmit (TX) local oscillator (LO) leakage calibration, comprising: directing a transmit signal having TX LO leakage to a receiver, the receiver co-located with a transmitter from which the transmit signal is directed; adjusting an impedance at an input to a low noise amplifier (LNA) in the receiver; detecting an LO signal at an output of the receiver; determining LO leakage from the LO signal; and correcting for the LO leakage.

12. The method of clause 11, wherein correcting for the LO leakage comprises adjusting an input to the transmitter.

13. The method of any of clauses 11 through 12, wherein adjusting the impedance at the input to the LNA further comprises adjusting a switched variable capacitance and adjusting a switched fixed inductance.

14. The method of clause 13, further comprising: adjusting a first variable resistance in series with the switched variable capacitance; and adjusting a second variable resistance in series with the switched fixed inductance.

15. The method of any of clauses 11 through 14, wherein the correcting for LO leakage comprises applying a DC offset to a mixer in the transmitter.

16. The method of clause 15, wherein a value of the DC offset minimizes TX LO leakage.

17. A device for transmit (TX) local oscillator (LO) leakage calibration, comprising: means for directing a transmit signal having TX LO leakage to a receiver, the receiver co-located with a transmitter from which the transmit signal is directed; means for adjusting an impedance at an input to a low noise amplifier (LNA) in the receiver; means for detecting an LO signal at an output of the receiver; means for determining LO leakage from the LO signal; and means for correcting for the LO leakage.

18. The device of clause 17, wherein the means for correcting for the LO leakage comprises means for adjusting an input to the transmitter.

19. The device of any of clauses 17 through 18, wherein the means for adjusting the impedance at the input to the LNA further comprises means for adjusting a capacitance and means for adjusting an inductance.

20. The device of clause 19, further comprising: means for adjusting a first variable resistance in series with the capacitance; and means for adjusting a second variable resistance in series with the inductance.

21. The device of any of clauses 17 through 20, wherein the means for correcting for LO leakage comprises means for applying a DC offset to a mixer in the transmitter.

22. The device of clause 21, wherein a value of the DC offset minimizes TX LO leakage.

23. An integrated circuit, comprising: a transmit portion configured to process transmit signals having a frequency above 20 GHz; a receive portion comprising a low noise amplifier (LNA) and configured to process receive signals having a frequency above 20 GHz; an interface circuit connected to the transmit portion, the receive portion, and a circuit pad couplable to an antenna; a switched fixed inductance coupled to the interface circuit and an input of the LNA; and a switched variable capacitance coupled to the interface circuit and the input of the LNA.

24. The integrated circuit of clause 23, wherein the switched fixed inductance and the switched variable capacitance are configurable to maintain a same input impedance for the LNA when the LNA is off as when the LNA is on.

25. The integrated circuit of any of clauses 23 through 24, further comprising a local oscillator cancellation element configured to adjust an input to the transmit portion based on TX LO leakage detected from the receive portion.

The circuit architecture described herein described herein may be implemented on one or more ICs, analog ICs, RFICs, mixed-signal ICs, ASICs, printed circuit boards (PCBs), electronic devices, etc. The circuit architecture described herein may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the circuit described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

Although selected aspects have been illustrated and described in detail, it will be understood that various substitutions and alterations may be made therein without departing from the spirit and scope of the present invention, as defined by the following claims.

What is claimed is:

1. A transmit (TX) local oscillator (LO) leakage calibration circuit, comprising:
    a transceiver having a transmit portion and a receive portion;
    an interface circuit connected to the transmit portion and the receive portion;
    an impedance control circuit connected to a low noise amplifier (LNA) in the receive portion, the impedance control circuit configured to adjust an input impedance for the LNA;
    a power detector coupled to an output of the LNA; and
    a local oscillator cancellation element connected to the power detector, the local oscillator cancellation element configured to adjust an input to the transmit portion based on TX LO leakage detected by the power detector.

2. The TX LO leakage calibration circuit of claim 1, wherein the impedance control circuit is configured to maintain a same input impedance for the LNA when the LNA is off as when the LNA is on, the impedance control circuit configured to selectively apply a transmit signal from the transmit portion directly to the LNA in the receive portion.

3. The TX LO leakage calibration circuit of claim 1, further comprising:
    a phase shifter connected to an output of the LNA;
    a radio frequency (RF) variable gain amplifier (VGA) connected to an output of the phase shifter;
    a narrow band tunable bandpass buffer configured to receive an output of the VGA, wherein the narrow band tunable bandpass buffer is configured to provide an input to the power detector.

4. The TX LO leakage calibration circuit of claim 1, wherein the interface circuit comprises a magnetic circuit having three inductances.

5. The TX LO leakage calibration circuit of claim 1, wherein the interface circuit comprises a magnetic circuit having two inductances and further comprising a third inductance external to the interface circuit.

6. The TX LO leakage calibration circuit of claim 1, wherein the impedance control circuit comprises a switched variable capacitance and a switched fixed inductance.

7. The TX LO leakage calibration circuit of claim 6, wherein the impedance control circuit comprises a first variable resistance in series with the switched variable capacitance and a second variable resistance in series with the switched fixed inductance.

8. The TX LO leakage calibration circuit of claim 1, wherein the transmit signal from the transmit portion applied to the LNA in the receive portion comprises TX LO leakage.

9. The TX LO leakage calibration circuit of claim 1, wherein the local oscillator cancellation element is configured to provide a DC offset to a mixer in the transmit portion.

10. The TX LO leakage calibration circuit of claim 9, wherein a value of the DC offset minimizes TX LO leakage.

11. An integrated circuit, comprising:
    a transmit portion configured to process transmit signals having a frequency above 20 GHz;
    a receive portion comprising a low noise amplifier (LNA) and configured to process receive signals having a frequency above 20 GHz;
    an interface circuit connected to the transmit portion, the receive portion, and a circuit pad couplable to an antenna;
    a switched fixed inductance coupled to the interface circuit and an input of the LNA; and
    a switched variable capacitance coupled to the interface circuit and the input of the LNA, the switched fixed inductance and the switched variable capacitance configured to adjust an input impedance for the LNA.

12. The integrated circuit of claim 11, wherein the switched fixed inductance and the switched variable capacitance are configurable to maintain a same input impedance for the LNA when the LNA is off as when the LNA is on.

13. The integrated circuit of claim 11, further comprising a local oscillator cancellation element configured to adjust an input to the transmit portion based on TX LO leakage detected from the receive portion.

* * * * *